Figure 1:
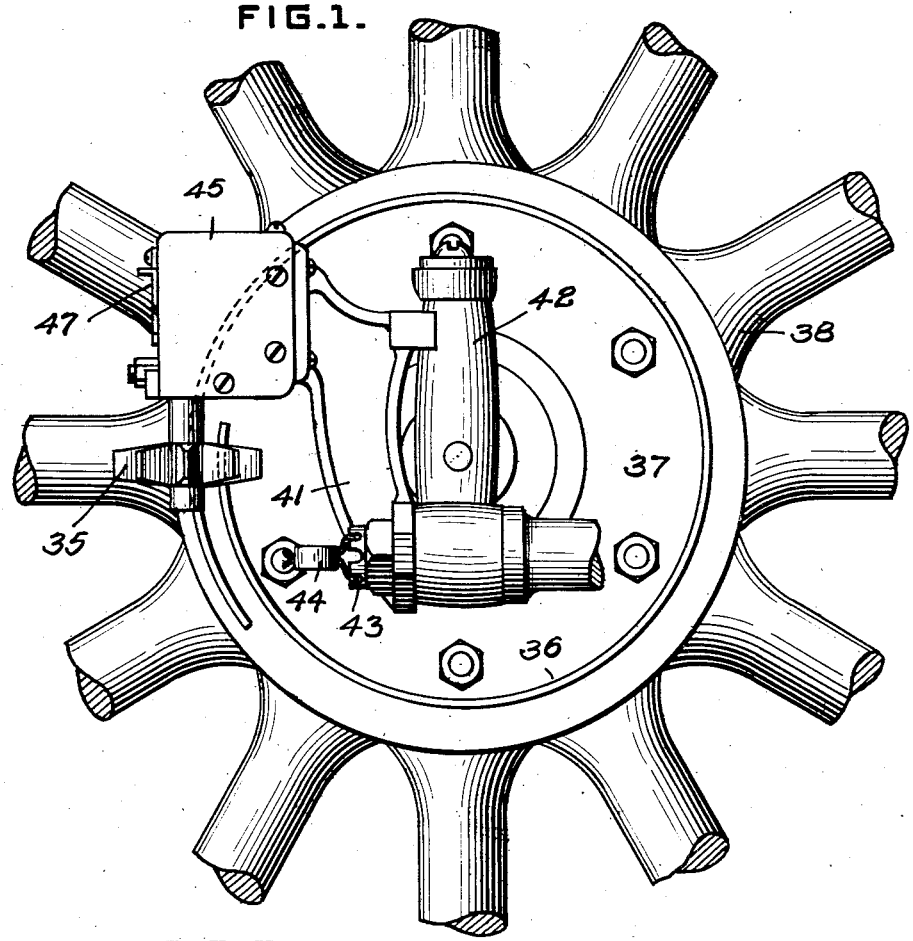

July 29, 1924.

W. EISENSCHMID

ODOMETER

Filed Nov. 15, 1921

1,502,719

2 Sheets-Sheet 1

WITNESSES

INVENTOR
William Eisenschmid

July 29, 1924.

W. EISENSCHMID

ODOMETER

Filed Nov. 15, 1921

1,502,719

2 Sheets-Sheet 2

WITNESSES
J. Herbert Bradley.

INVENTOR
William Eisenschmid
By Grew and McCallister
His Attorneys in fact

Patented July 29, 1924.

1,502,719

UNITED STATES PATENT OFFICE.

WILLIAM EISENSCHMID, OF ETNA, PENNSYLVANIA, ASSIGNOR TO PITTSBURGH TAXI-METER COMPANY, OF PITTSBURGH, PENNSYLVANIA, A CORPORATION OF PENNSYLVANIA.

ODOMETER.

Application filed November 15, 1921. Serial No. 515,312.

*To all whom it may concern:*

Be it known that I, WILLIAM EISENSCHMID, a citizen of the United States, and a resident of Etna, in the county of Allegheny and State of Pennsylvania, have made a new and useful invention in Odometers, of which the following is a specification.

This invention relates to odometers or devices for registering the miles traveled by wheeled vehicles.

An object of this invention is to provide an odometer of simple and rugged construction and one which will register with equal accuracy irrespective of the direction of the vehicle's travel.

This, as well as other objects which will readily appear to those skilled in this particular art, I attain by means of the device described in the specification and illustrated in the drawings accompanying and forming a part of this application and in which similar elements are denoted by like characters.

Figure 2:
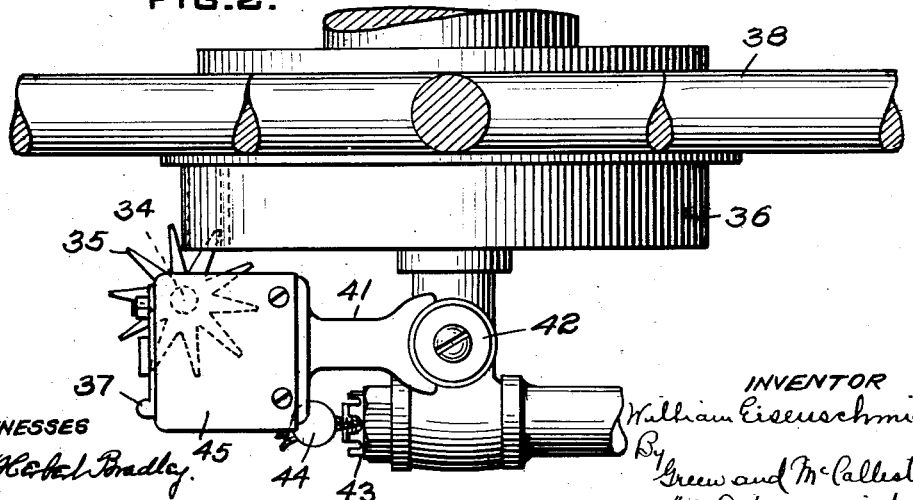
Figure 3:
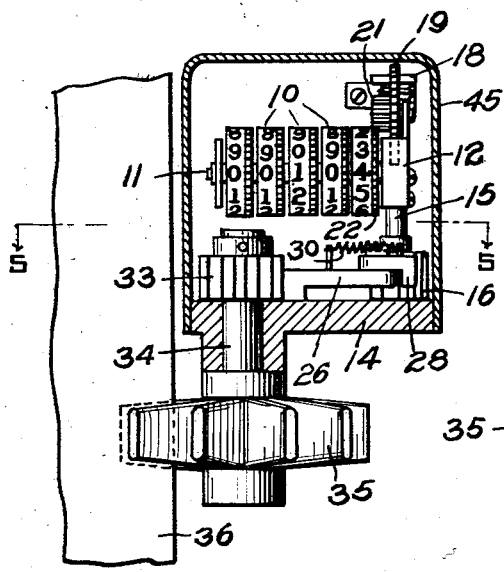
Figure 4:
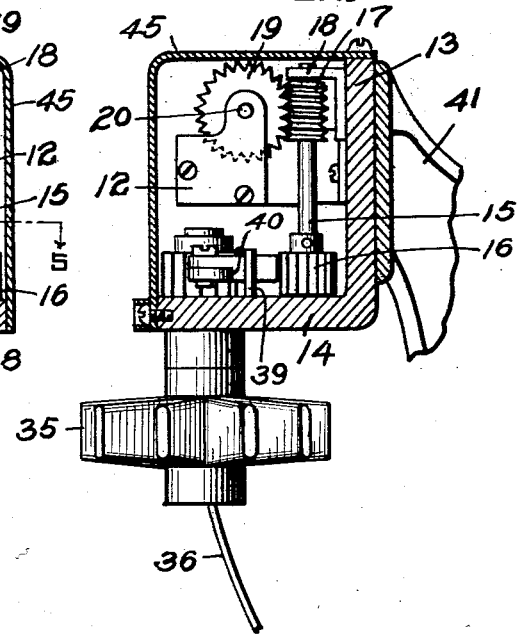
Figure 5:
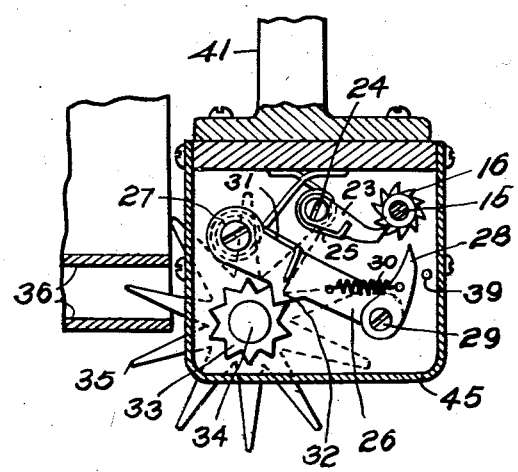
Figure 6:
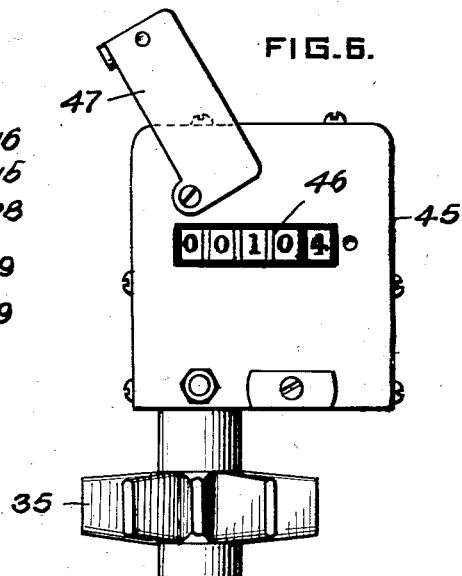

In the drawings, Figure 1 is a view in side elevation of the inside central portion of the front wheel of a vehicle showing a device embodying this invention attached in place. Fig. 2 is a top plan view of the same. Fig. 3 is a side sectional view in elevation of the device. Fig. 4 is an end sectional view of the same. Fig. 5 is a sectional plan view taken on line 5—5 of Fig. 3. Fig. 6 is a front view in elevation of the device.

Instead of mounting the odometer of this invention on the hub of the vehicle as is now commonly done, I prefer to mount the same on a part of the steering knuckle inside of one of the vehicle's front wheels and I prefer to drive the same from a spiral gear attached to the inner face of said wheel.

The odometer consists of a series of axially aligned intergeared counter wheels and mechanism between said spiral gear and the counter wheels for advancing said wheels a definite amount or distance upon each revolution of the vehicle front wheel irrespective of the direction of travel of the vehicle whether forward or back.

Counter wheels 10 preferably 5 in number, are intergeared or connected as is now common and mounted on a spindle or shaft 11, journaled in a support bracket 12 secured to an upstanding back member 13 formed integral with base plate 14.

An upright spindle 15 at its lower end carrying a ratchet wheel 16 and at its upper end a worm 17 is journaled in the base plate 14 and a bracket 18 secured to back member 13. This worm meshes with a worm wheel 19 fixed upon a shaft 20 which shaft carries a gear 21 meshing with a gear 22 rigidly connected to the first wheel of the series of counter wheels. A dog 23 pivoted at 24 to base plate 14 is held in engagement with ratchet wheel 16 by means of a spring 25 and prevents the ratchet wheel from moving in a counter-clockwise direction.

A lever 26 pivoted to the base plate 14 at 27 at its free end carries a pawl 28 pivoted to the lever at 29 and retained in normal position by means of a spring 30. A spring 31 engaging lever 26 normally holds the same so that pawl 28 is out of contact with ratchet wheel 16.

Lever 26 is provided with a triangular cam projection 32 and a star wheel 33 mounted on the upper end of a shaft 34 which extends through the base plate oscillates lever 26 as it (the star wheel) is rotated. The triangular cam 32 is so formed with relation to the star wheel that lever 26 will be oscillated a definite number of times for each complete revolution of the star wheel, irrespective of the direction of rotation of the star wheel. Vertical shaft 34 which carries star wheel 33 at its upper end, at its lower end carries a gear 35 which meshes with spiral gear 36 secured to face plate 37 which in turn is bolted to the inside of the front wheel 38, of the vehicle. The spiral gear 36 is so formed that with each complete revolution of wheel 38, gear 35 and therefore star wheel 33 will be advanced one tooth and this no matter in which direction spiral gear 36 revolves.

A pin 39 secured to base 14 limits the outward throw of pawl 28 and causes it to follow the ratchet while moving away from star wheel 33. The inner movement of the pawl is limited by means of a shoulder 40 on the pawl which contacts with the side of lever 26 and is yieldingly held in contacting position by means of spring 30.

A bracket 41 secured to back plate 13 is adapted to be secured to the steering knuckle 42 of the vehicle and to be locked thereto by means of castellated lock nut 43 and seal 44.

A sheet metal housing 45 secured to the back and base plates by means of suitable screws, is provided for housing the mechanism and this is provided with a window 46 through which one line of numerals on the counters are visible. A cover 47 hinged to the front of the housing or casing is provided for normally covering the window.

Having thus described my invention, what I claim is:—

In a device of the character described, counters mounted in a bracket adapted to be secured to a steering knuckle adjacent a vehicle wheel, a worm for driving said counters, a ratchet on the worm shaft, a pawl pivoted to said bracket for operating said ratchet and having a cam surface, a star wheel engaging said cam surface and means driven by the vehicle wheel for driving said star wheel for advancing said counters the same definite amount irrespective of the direction of rotation of the vehicle wheel.

In testimony whereof, I have hereunto subscribed my name this 4th day of November, 1921.

WM. EISENSCHMID.